(12) United States Patent
Dick et al.

(10) Patent No.: US 12,162,522 B2
(45) Date of Patent: Dec. 10, 2024

(54) BROKEN WHEEL DETECTION ON RAILROAD TRAINS

(71) Applicant: ENSCO, INC., Springfield, VA (US)

(72) Inventors: Matthew Dick, Charlottesville, VA (US); Amaury Rolin, Charlottesville, VA (US)

(73) Assignee: ENSCO, INC., Springfield, VA (US)

( * ) Notice: Subject to any disclaimer, the term of this patent is extended or adjusted under 35 U.S.C. 154(b) by 0 days.

(21) Appl. No.: 18/532,304

(22) Filed: Dec. 7, 2023

(65) Prior Publication Data

US 2024/0246581 A1  Jul. 25, 2024

Related U.S. Application Data

(63) Continuation of application No. 16/839,532, filed on Apr. 3, 2020, now Pat. No. 11,873,016.

(60) Provisional application No. 62/829,148, filed on Apr. 4, 2019.

(51) Int. Cl.
*B61K 9/12* (2006.01)
*B61L 15/00* (2006.01)
*G01M 17/10* (2006.01)

(52) U.S. Cl.
CPC ............ *B61K 9/12* (2013.01); *B61L 15/0027* (2013.01); *B61L 15/0072* (2013.01); *B61L 15/0081* (2013.01); *B61L 15/009* (2013.01); *G01M 17/10* (2013.01); *B61L 2205/00* (2013.01)

(58) Field of Classification Search
CPC ...... B61K 9/12; G01M 17/10; G01M 13/045; B61L 15/0027; B61L 15/0072; B61L 15/0081; B61L 15/009; B61L 2205/00
USPC .......................................................... 246/169
See application file for complete search history.

(56) References Cited

U.S. PATENT DOCUMENTS

| | | | |
|---|---|---|---|
| 4,129,276 A | 12/1978 | Svet | |
| 5,433,111 A | 7/1995 | Hershey | |
| 7,213,789 B1 | 5/2007 | Matzan | |
| 10,259,477 B2* | 4/2019 | LeFebvre | ............... B61L 25/04 |
| 10,507,851 B1 | 12/2019 | Byford | |
| 2008/0074679 A1 | 3/2008 | Nayebi | |
| 2016/0325767 A1* | 11/2016 | LeFebvre | ............... B61L 27/40 |
| 2017/0210401 A1 | 7/2017 | Mian | |
| 2018/0208221 A1 | 7/2018 | Singh | |

(Continued)

FOREIGN PATENT DOCUMENTS

WO   WO 2005/105536 A1   11/2005

OTHER PUBLICATIONS

Beenavision, "TreadView," Web page, < https://beenavision.com/Tread View.php>, retrieved from the Internet on Jul. 21, 2020 (4 pages).

*Primary Examiner* — Zachary L Kuhfuss
(74) *Attorney, Agent, or Firm* — Nixon Peabody LLP (57) ABSTRACT

A sensor device includes an audio sensor and a wireless communication module. The audio sensor is configured to be mounted on a railroad vehicle. The audio sensor is configured to (i) monitor sounds emanating from one or more wheels of the railroad vehicle as the railroad vehicle moves along a track and (ii) generate sound data associated with the monitored sounds emanating from the one or more wheels. The wireless communication module is configured to transmit a broken wheel signal responsive to a determination that a portion of the generated sound data is indicative that a first one of the one or more wheels is damaged or broken.

20 Claims, 5 Drawing Sheets

(56) References Cited

U.S. PATENT DOCUMENTS

2018/0222498 A1  8/2018  Kelley
2018/0222504 A1  8/2018  Birch
2018/0273066 A1  9/2018  Mulligan
2019/0250069 A1  8/2019  Samadani

* cited by examiner

BROKEN WHEEL DETECTION ON RAILROAD TRAINS

CROSS REFERENCE TO RELATED APPLICATIONS

This application is a continuation of U.S. patent application Ser. No. 16/839,532 filed Apr. 3, 2020, now allowed, which claims the benefit of and priority to U.S. Provisional Patent Application Ser. No. 62/829,148, filed on Apr. 4, 2019, each of which is hereby incorporated by reference herein in its entirety.

TECHNICAL FIELD

The present disclosure is directed to a sensor device, primarily to be mounted on a railroad vehicle, to monitor critical parameters of bogie components, such as the sensing of sounds and/or vibration of the wheels of a railroad train comprising many railroad cars. The sensor device can detect abnormal sounds and/or vibrations attributable to a wheel anomaly (e.g., a defect or damage in the wheels of the train) well before a cataclysmic derailment. A system for monitoring the wheels of a railroad train including the sensor device and a method of alerting a lead locomotive of the railroad train utilizing an alert generated by the system are also disclosed.

BACKGROUND

A railroad car or railcar (American and Canadian English), railroad wagon or railroad carriage (British English and UIC also called a train car or train wagon) are all railroad vehicles used for the carrying of passengers or cargo on a rail transport system, each of which is generically referred to herein as a railroad vehicle. Railroad vehicles are mounted on a plurality of wheels carried on an undercarriage of a railroad car, which is known as a bogie. The bogie may comprise four to six individual wheels pivoted beneath each end of a railroad car. Thus, eight to twelve individual wheels support each railroad car. A wheel anomaly (e.g., defect and/or damage) in any one of these wheels may lead to cataclysmic failure of the wheel if not detected at an early stage and acted upon appropriately, resulting in possible derailment of the train.

Detection may include an individual's visual and audio inspection. When a train is stopped at a yard, an inspector will visually inspect wheels. When a train is traveling, ad-hoc visual and audio inspections are performed by inspectors from one side of the train. These inspections are subject to error and limited monitoring coverage.

It is also possible to place wayside devices along a portion of the track used by the railroad train. However, such wayside devices require personnel to go out to the field to service and monitor the wayside devices along the track, and would require a system for communicating a detected wheel anomaly from the wayside device to a central point and then relay that anomaly to the lead locomotive of the train involved. Even then, it might not pinpoint the wheel anomaly which would then require individual inspection of the train's wheels. Furthermore, if a wheel was undamaged when it passed the sensor, but developed a wheel anomaly thereafter during the journey of the train, the wheel anomaly might escape detection.

Thus, there is a need for being able to detect wheel anomalies occurring during the movement of the train along the railroad tracks.

SUMMARY

According to some implementations of the present disclosure, a sensor device is provided for mounting on a railroad vehicle. The sensor device is able to continuously monitor critical parameters, including acoustic sounds and vibrations generated by the wheels of a bogie. The sensor device can be called a "bogie-sensor" in that it is primarily used to detect abnormal sounds and/or vibrations emanating from one or more wheels of the bogie.

According to some implementations of the present disclosure, the sensor device is self-contained, includes a power source, a transmitter, accelerometers and contains a processor (CPU) which conducts signal processing by comparing the critical parameters against defined standards and thus filters normal bogie sounds, such as the wheels passing over rail gaps at joints in the tracks or at switches, from abnormal sounds or vibrations, which may indicate a damaged wheel. The CPU can also generate an alert signal that is sent to another location (e.g., to the lead locomotive) when a damaged wheel is detected using the sensor of the present disclosure.

According to some implementations of the present disclosure, the sensor device includes at least a part of a wireless network to enable communication between the sensor device and at least one other sensor device coupled to the train to pinpoint the wheel with the anomaly, even if such wheel is on a railroad vehicle different from the railroad vehicle carrying the sensor device and/or the at least one other sensor device. The wireless network can enable an alert to be transmitted to the lead locomotive of the train (or any other car, locomotive, or device of the train) responsive to a wheel anomaly being detected. Low powered radios, such as Zigbee, can be used to create a linear network of sensor devices that span the entire length of the train.

According to some implementations of the present disclosure, the sensor device of the present disclosure includes a timing device to implement a timing synchronization along a linear network to communicate a periodic impact event, timing among multiple devices (e.g., multiple sensor devices of the present disclosure) using a time difference of arrival ("TDOA") algorithm to estimate and/or determine a location of the periodic impact within and/or along a train having the sensor devices coupled thereto.

According to some implementations of the present disclosure, a status reporting unit is provided as part of a system to report the status of the individual sensor devices as well as to report the location of the periodic impact corresponding to a wheel anomaly (e.g., a broken or damaged wheel) to the operator of the train.

According to some implementations of the present disclosure, a sensor device includes a housing, an audio sensor, a CPU, and a transmitter. The housing is configured to be mounted on a first railroad vehicle. The audio sensor is coupled to the housing and configured to (i) monitor sounds emanating from one or more wheels of the first railroad vehicle as the first railroad vehicle moves along a track and (ii) generate sound data associated therewith. The CPU is configured to compare the generated sound data with known wheel sounds to determine if a wheel anomaly sound is present within the generated sound data. The transmitter is configured to transmit a wheel anomaly signal responsive to a determination by the CPU that a portion of the generated sound data is indicative that a first one of the one or more wheels has a wheel anomaly (e.g., is broken and/or damaged).

According to some implementations of the present disclosure, a system for monitoring wheels of a train as the train moves along a track includes a first sensor device and a second sensor device. The first sensor device is mounted on a first railroad vehicle of the train. The first sensor device includes a first audio device and a first transmitter. The first audio sensor is configured to (i) monitor sounds emanating from a first portion of a plurality of wheels of the train as the train moves along the track and (ii) generate a first set of sound data associated with the monitored sounds emanating from the first portion of the plurality of wheels. The first transmitter is configured to transmit a first broken wheel signal responsive to a determination that a portion of the first set of sound data is indicative that a first one of the first portion of the plurality of wheels is broken. The second sensor device is mounted on a second railroad vehicle of the train. The second device includes a second audio sensor and a second transmitter. The second audio sensor is configured to (i) monitor sounds emanating from a second portion of the plurality of wheels of the train as the train moves along the track and (ii) generate a second set of sound data associated with the monitored sounds emanating from the second portion of the plurality of wheels. The second transmitter is configured to transmit a second broken wheel signal responsive to a determination that a portion of the second set of sound data is indicative that a first one of the second portion of the plurality of wheels is broken.

According to some implementations of the present disclosure, a method of alerting a lead locomotive of a wheel anomaly includes mounting at least two sensor devices on different railroad vehicles of the train. Each of the at least two sensor devices includes an audio sensor and a wireless communications module. The audio sensor is configured to (i) monitor sounds emanating from one or more wheels of the train as the train moves along a track and (ii) generate sound data associated therewith. The wireless communication module is configured to wireless couple the at least two sensor devices together. The generated sound data is analyzed. A portion of the generated sound data determined to be indicative of a wheel anomaly existing in a first one of the one or more wheels of the train. A wheel anomaly signal is transmitted.

According to some implementations of the present disclosure, a sensor device includes an audio sensor and a wireless communication module. The audio sensor is configured to be mounted on a railroad vehicle. The audio sensor is configured to (i) monitor sounds emanating from one or more wheels of the railroad vehicle as the railroad vehicle moves along a track and (ii) generate sound data associated with the monitored sounds emanating from the one or more wheels. The wireless communication module is configured to transmit a wheel anomaly signal responsive to a determination that a portion of the generated sound data is indicative that a first one of the one or more wheels includes a wheel anomaly.

These and other implementations will be further discussed in connection with the appended drawings and the following detailed description of the embodiments.

DETAILED DESCRIPTION OF THE EMBODIMENTS

Figure 1:
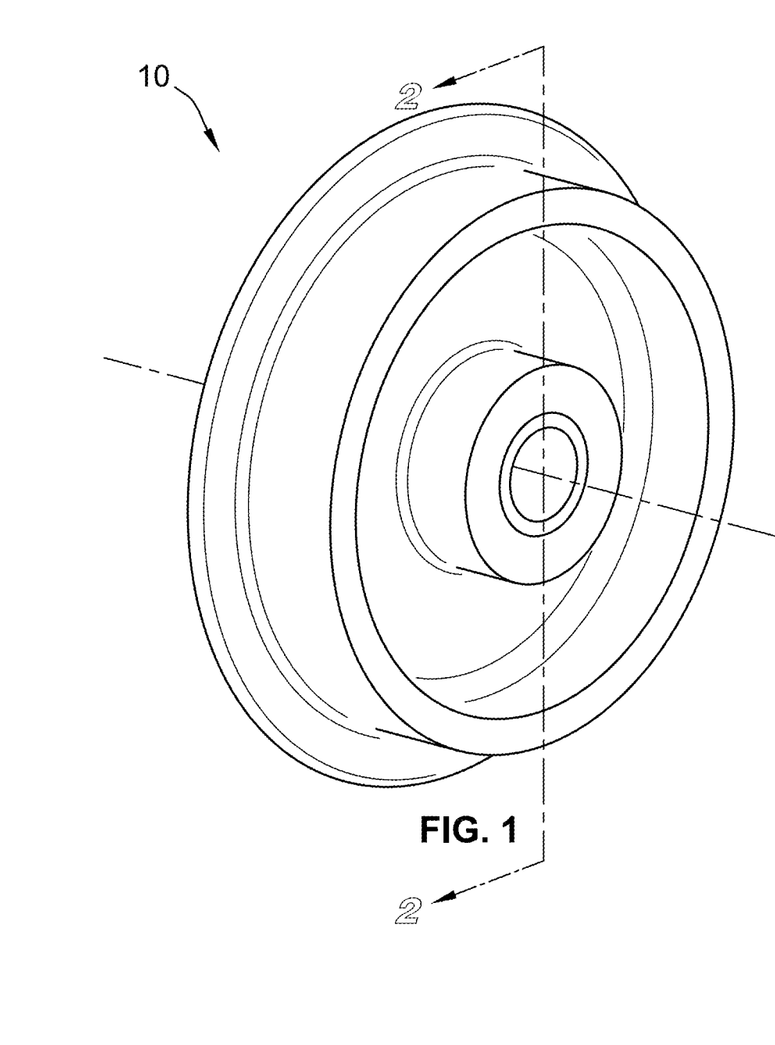
FIG. 1 is a perspective view of a railroad wheel, according to some implementations of the present disclosure.
Figure 2:
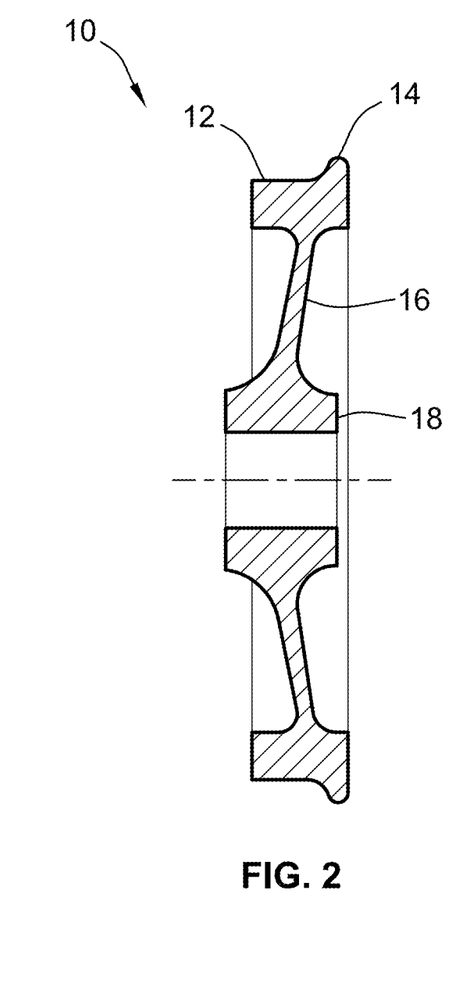
FIG. 2 is a cross-sectional view of the railroad wheel of FIG. 1, according to some implementations of the present disclosure.

FIG. 1 illustrates a typical newly manufactured railroad wheel 10. FIG. 2 is a cross-sectional view of the railroad wheel 10. As shown, the wheel 10 includes a tread 12, a flange 14, a wheel plate 16, and a hub 18. The wheel plate 16 connects the flange 14 and tread 12 to the hub 18.

Figure 3:
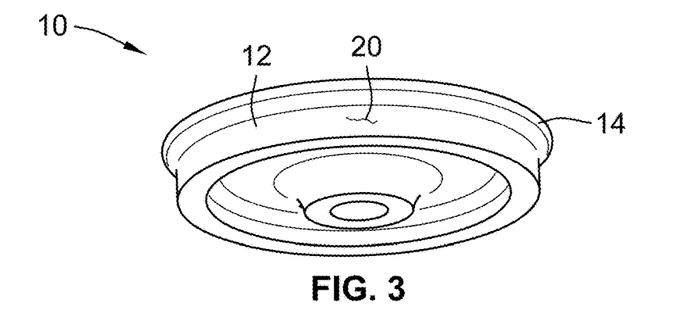
FIG. 3 is a perspective view of the railroad wheel of FIG. 1 with a crack in a tread of the railroad wheel, according to some implementations of the present disclosure.
Figure 4:
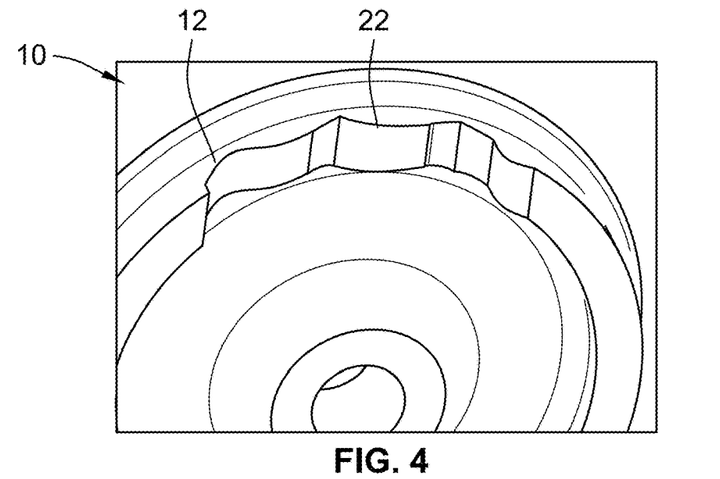
FIG. 4 is a perspective view of the railroad wheel of FIG. 1 with a missing chunk in the tread of the railroad wheel, according to some implementations of the present disclosure.

During use of the wheel 10 on, for example, an undercarriage (see FIG. 5) of a railroad vehicle, the wheel 10 and others like it, may develop a plurality of different defects over time due to, for example, normal wear and tear. For example, a crack 20 (FIG. 3) in the tread 12 can develop. For another example, a flat can develop in the tread 12 when, for example, the wheel 10 is locked by the brakes and skids along a rail. Other defects can include a missing chunk 22 (FIG. 4) in the tread 12 of the wheel 10, which may develop as a consequence of the flat (not shown).

Figure 5:
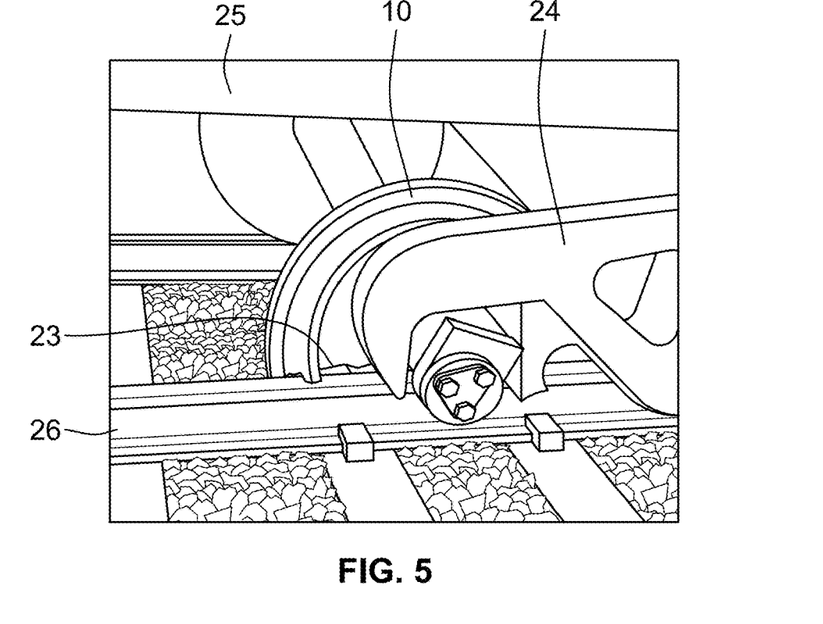
FIG. 5 is a perspective view of a portion of an undercarriage of a railroad vehicle including the railroad wheel of FIG. 1 with a catastrophic failure including a broken wheel, according to some implementations of the present disclosure.

Unless defects (e.g., flats, cracks, missing chunks, etc.) are promptly discovered, these defects and others like them may result in the wheel 10 suffering a catastrophic failure 23 such as the one shown in FIG. 5, which may displace the under carriage 24 of railroad car from its normal operating position and potentially lead to derailment of the train from track 26.

Figure 6:
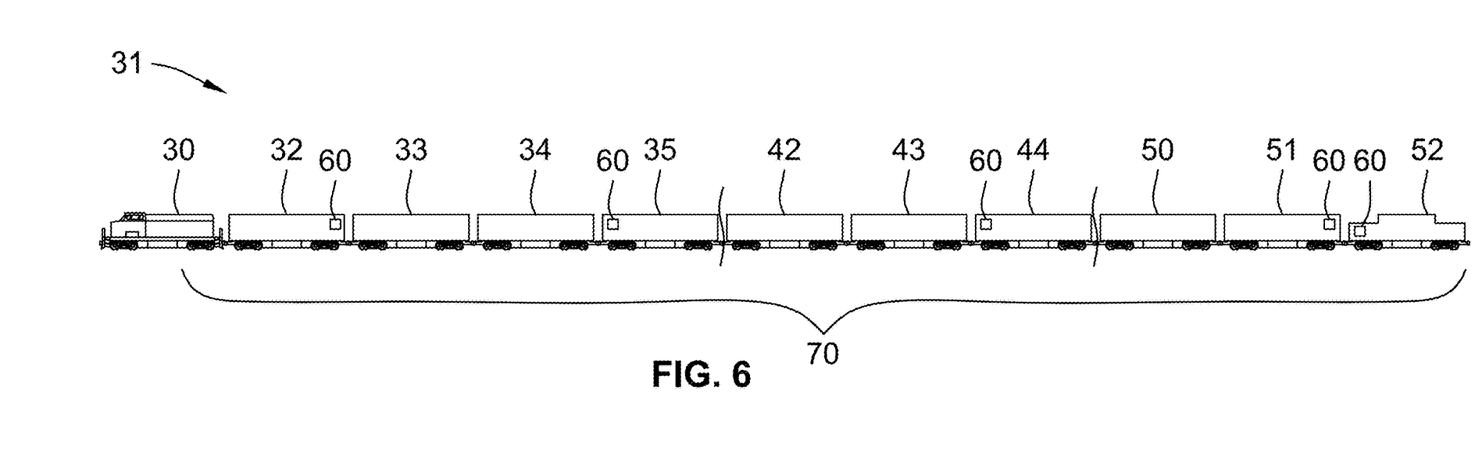
FIG. 6 schematic illustration of a railroad train having multiple railroad cars, a lead locomotive, a caboose, and a plurality of sensor devices, according to some implementations of the present disclosure.

Turning now to a sensor device of the present disclosure, the system in which the sensor device(s) is incorporated and its method of operation, all of which are depicted in FIG. 6, it can be seen that a lead locomotive 30 provides the motive force for a train 31. A plurality of individual railroad cars 32, 33, 34, 35, 42, 43, 44, 50, 51 and 52 are pulled by lead locomotive 30. The breaks between cars 35 and 42 as well as between cars 44 and 50 are indicative of additional railroad cars (not shown) which may be part of the train 31. The car 52 is the last railroad vehicle/car of the train 31, and can be the same as, or similar to, cars 32-51, a caboose, a car cab, or a locomotive that is the same as, or similar to, the lead locomotive 30.

As shown, each of the cars 32, 35, 44, 51, and 52 are placed respective sensor devices 60. Each of the sensor devices 60 is substantially identical and will be described in detail in connection with FIGS. 7 and 8. Alternatively, the sensor devices 60 can vary along the train 31. The sensor devices 60 on the cars of the train 31 are in communication with each other and in some implementations form a mesh network 70 (FIGS. 6 and 9). Each sensor device 60 is uniquely identified in its position on a specific railroad vehicle forming part of train 31. For example, in FIG. 6, sensor device 60 on car 32 can be identified by its location within train 31 in various manners. Its signal generated to lead locomotive 30 could include its GPS position by reason of one or more accelerometers 81 (FIG. 8) included in the sensor device 60. Alternatively, the unique position could be recorded together with a car number stenciled or burned into the railroad vehicle/car 32.

Figure 7:
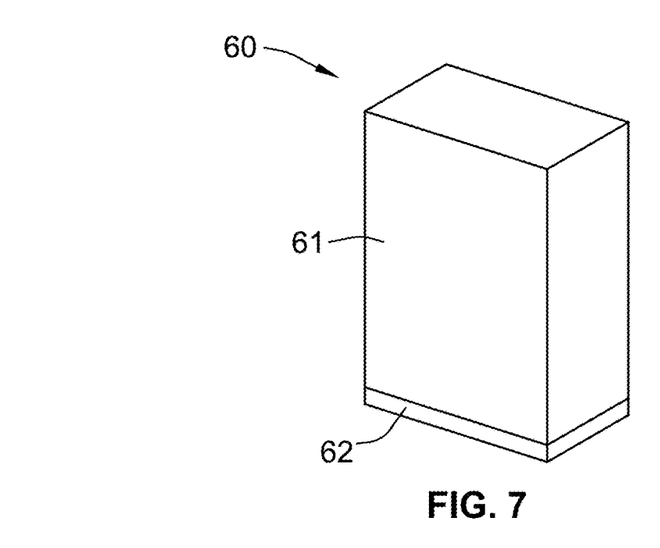
FIG. 7 is a schematic illustration of one of the plurality of the sensor devices of FIG. 6 according to some implementations of the present disclosure.

As shown schematically in FIG. 7, sensor device 60 includes a housing 61 to protect the internal components of the sensor device 60. Each of the sensor devices 60 of the present disclosure includes a sound sensor 63 (FIG. 8) for monitoring the of sounds and/or vibrations emanating from the wheels of train 31 (FIG. 6) and/or other portions or components of the train 31 (e.g., an axle, a bearing, a suspension component, a truck side frame, a truck bolster, a bogie side frame, a bogie bolster, etc. of the cars 32, 35, 44, 51, and/or 52). The sound sensor 63 can detect sounds that are audible to a human ear and/or sounds that are not audible to a human ear. In some implementations, the sound sensor 63 includes an accelerometer that is able to detect sounds that are not audible to the human ear (e.g., sub Hz level starting on the low end from about 0.1 Hz to the high end of about 50 kHz). Sounds that are not audible to the human ear are referred to herein as vibrations, which, in some cases can be felt by humans. In some implementations, the sound sensor 63 includes a first sound sensor that is able to detect a first range of frequencies and a second sound sensor that is able to detect a second range of frequencies. The first and second ranges of frequencies can overlap or be completely separate and distinct and not overlap. In some implementations, the first range of frequencies is audible to the human ear (e.g., approximately 20 Hz to 20 kHz) and the second range of frequencies is not audible to the human ear (e.g., approximately 0.1 Hz to 20 Hz and/or approximately 20 kHz to 50 kHz).

Figure 8:
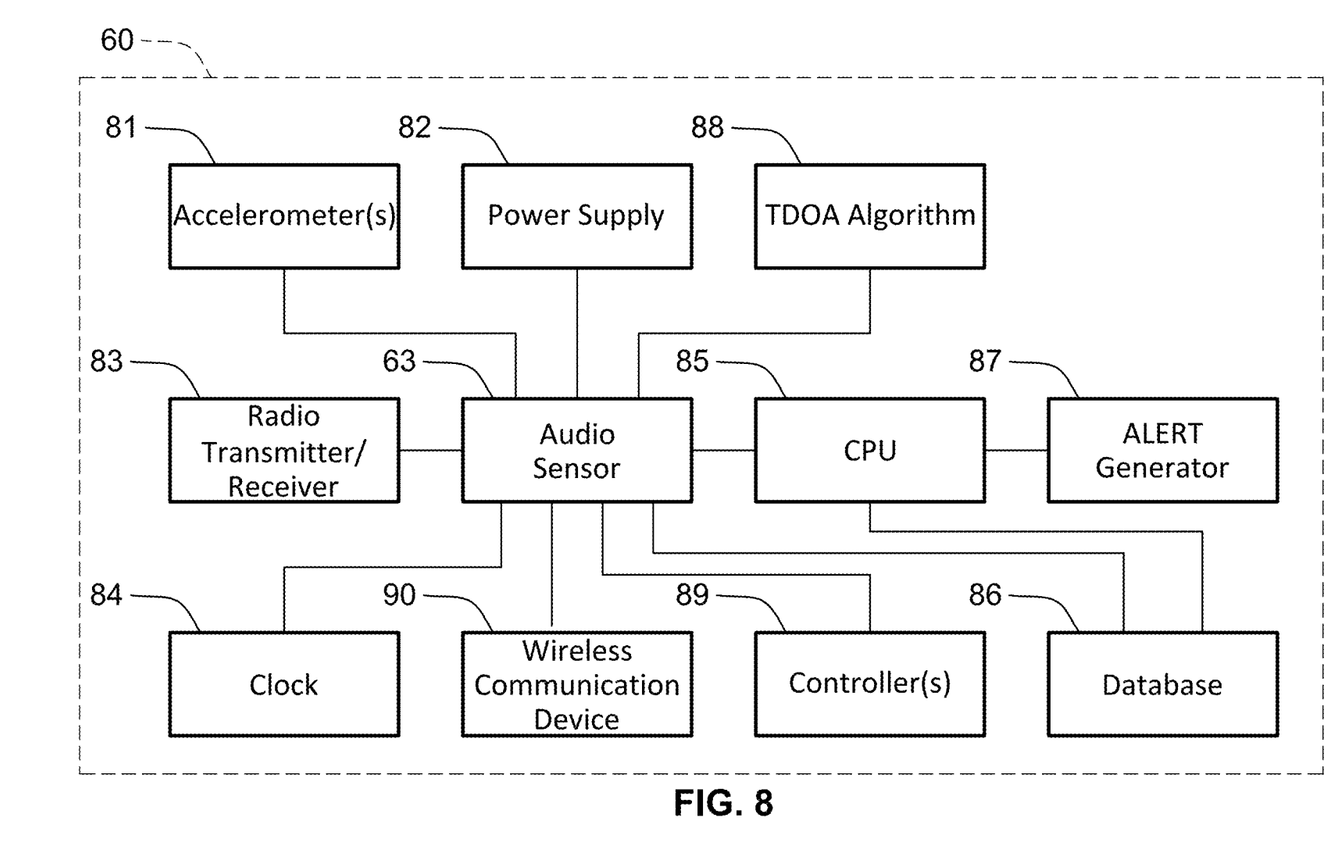
FIG. 8 is a block diagram illustrating components of the sensor device of FIGS. 6 and 7, according to some implementations of the present disclosure.
Figure 9:
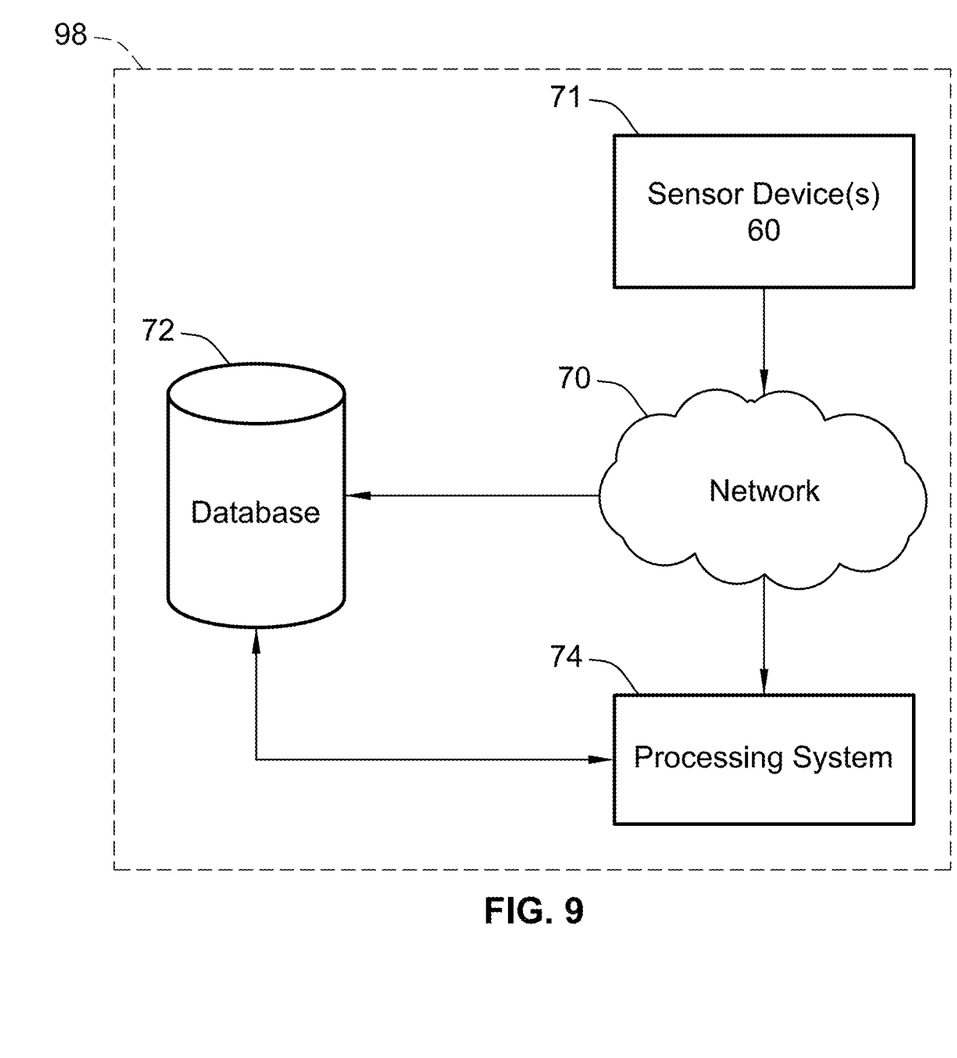
FIG. 9 is a schematic illustration of a system including the plurality of sensor devices of FIG. 6, a network, a processing system, and a database, according to some implementations of the present disclosure.

As shown in FIG. 8, each of the sensor devices of the present disclosure may also include one or more of the following elements: a CPU 85, a transmitter and receiver 83, one or more accelerometers 81, a wireless communication device 90, such as, for example, a low-power radio (e.g., a Zigbee radio or any other wireless communication protocol that permits the sensor devices 60 to communicate along the train 31), a power supply 82, a time difference of arrival (TDOA) algorithm 88, an alert generator 87, a clock 84, one or more controllers 89, a database, 86 or any combination thereof. That is, FIG. 8 is a block diagram of the components which can form part of sensor device 60.

One or more of the components of the sensor device 60 shown in FIG. 8 may be combined or separated from the sensor device 60, so long as the functions of the components are preserved within an overall system, such as, for example, the system 98 shown in FIG. 9. That is, in some implementations, one or more of the functions performed by the components shown in FIG. 8, can be performed by components outside of the sensor device 60.

In some implementations, a plurality of the sensor devices 60 can mesh together (e.g., using their wireless communication devices included therein) to form a group of sensor devices where each sensor device becomes an outpost, able to communicate with one or more other sensor devices in the group at various distances (e.g., from about ten to about one hundred meters). The wireless communications devices are able to cope with many sensor devices on the network, such that having five, ten, twenty, fifty, or even one hundred or more sensors devices 60.

Each sensor device 60 may be self-powered as the power supply 82 (e.g., one or more batteries, wind, solar, or by a generator attached to the wheels 10, or any combination thereof). Preferably, the power supply 82 is and/or includes a rechargeable battery, and can be recharged by any of wind, solar, or the generator.

The controller(s) 89 can be used to control the power supply 82, such as by connecting a battery to the sound sensor 63, especially when the sound sensor 63 is operated intermittently. Controller(s) 89 can also be used to regulate the output signal from the CPU 85 to cause alert generator 87 to be activated.

Referring to FIG. 7, mounting the sensor device 60 upon the railroad cars, e.g. railroad car 32, may be by magnetic mounts 62, a slideable coupler or into a female socket is contemplated by this disclosure.

As shown in FIGS. 6 and 9, a plurality of the sensor devices 60 can be connected to form a mesh network 70. In such implementations, each sensor device 60 transmits monitored sounds and/or vibrations to other ones of the plurality of sensor devices 60 and/or a dedicated one of the sensor devices 60 (e.g., the sensor device 60 that is closest to the lead locomotive 30 and/or a device located within the lead locomotive 30). The sensor devices 60 may also transmit their location on train 31, as well as transmit their location with regard to the earth, while moving with the train 31. The network 70 can include, or be connected to a database 72 (FIG. 9) used to store data associated with the detected sounds and/or vibrations, as well as known characteristic sounds and vibrations, such as sounds associated with railroad wheels traversing gaps between ends of adjoining rails, sounds associated with railroad wheels traversing railroad switches, sounds associated with railroad wheels traversing any other railroad condition.

In some implementations, the CPU 85 (FIG. 8) of one or more of the sensor devices 60 compares sensed sounds to the known characteristic sounds stored in the database 86 and acts as a filter to isolate the sounds and vibrations associated with a wheel defect from other wheel sounds. Alternatively or additionally, the processing system 74 (FIG. 9) compares sensed sounds to the known characteristic sounds stored in the database 72 (and/or database 86) and acts as a filter to isolate the sounds and vibrations associated with a wheel defect from other wheel sounds. In some such alternative implementations, the processing system 74 receives filtered signals indication of a wheel defect from the CPU 85 of one of the sensor devices 60 and detects and categorizes a wheel defect. The processing system 74 may include a communication link (wireless or wired) to transmit an alert to lead locomotive 30 (FIG. 6). Depending on the type of alert, such as imminent catastrophic failure of a wheel, detection of a damaged, but not imminent catastrophic failure of the wheel, the alert can initiate immediate or later action (e.g., stopping of the train 31, initiating a call to emergency personal, sending a message or alert to an operator of the train, or any combination thereof). The processing system 74 can also record and store other types of data, such as information indicative of a defect in the track (e.g., not a wheel problem), that can be stored for later action. Such later action might include a referral to a track maintenance system.

The nature of the wheel defect, from a minor crack 20 in the tread 12, to a missing chunk 22 can initiate different signals to the lead locomotive 30 indicating the severity of the wheel defect. If the wheel defect is in a bogie set not on any particular railroad car upon which the sensor device 60 is mounted, but is on railroad cars situated between railroad cars on which sensor devices 60 are mounted, the processing system 74 can also estimate and/or determine the location of the wheel and/or railroad car that includes the wheel from which the sounds/vibrations are emanating that are indicative of a defect.

While sounds are vibrations within the audible human range of hearing, normally within 20 to 20,000 Hertz (cycles per second), vibrations exist below and above the range of human hearing. However, for brevity in this specification and the appended claims, the term "sound and vibrations" include vibrations within and outside the normal range of human hearing, i.e. include sounds which are not in the audible range of humans.

By use of the location sensor signals emanating from each sensor device 60, and by use of an algorithm based upon time difference of arrival, the location of the wheel defect can be determined as further described below.

Initiation of the various power, network, and wireless communications of sensor devices 60 can commence upon mounting of the sensor device 60 on the railroad car (e.g., railroad cars 32, 35, 44, 51, and 60). It should be understood that the sensor devices 60 do not have to be mounted upon every railroad vehicle of the train 31. For example, mounting the sensor devices 60 about every five, ten, twenty, thirty, forty, etc. railroad cars can be sufficient to form the mesh network 70, such that the mesh network 70 extends and/or covers the entire length of the train 31 (FIG. 6). Each of the sensor devices 60 can be associated with the railroad car on which it is mounted and its position in the network 70 specific to the train 31 determined by the accelerometers in each of the sensor devices 60. In such an event, sounds emanating from other trains that pass train 31 will not be confused with the sounds emanating from the wheels 10 of train 31. If additional sensor devices are needed (e.g., to establish a contiguous mesh network, strengthen the mesh network, elongate the mesh network to include newly added cars to the train 31, etc. or any combination thereof), one or more sensor devices 60 can be easily added to the railroad vehicles as required.

Independent non-transient memory can be provided within database 72 (FIG. 9), or in a separate memory module to record sensed sound/vibration data, location, time and other data captured by the processing system 74.

When abnormal sounds are heard or vibrations felt by one or more of the sensor devices 60 that are indicative of an anomaly (e.g., a broken wheel 10), an alert can be transmitted from CPU 85 to lead locomotive 30. The anomaly can be, for example, a broken wheel, a damaged wheel, a chipped wheel, a cracked wheel, a derailed wheel, a broken or damaged axle, a broken or damaged bearing, a broken or damaged suspension component, a broken or damaged truck component, a broken or damaged bogie component, or any combination thereof. If the sensed abnormal sound/vibration is not on the railroad vehicle on which the sensor device 60 is located, the plurality of sensor devices 60 may be used to triangulate a location of the anomaly (e.g., a broken or damaged wheel). For example, if the sensor devices 60 on railroad vehicles 32 and 35 (see FIG. 6) each sense the critical parameters indicating a wheel anomaly (e.g., a broken or damaged wheel), such as the sounds or vibrations of a flat in the tread, or a chunk missing from the wheel, a timing device within each of the sensor device 60 in railroad vehicles 32, 35 will transmit the time the sound is sensed by each of the sensor devices 60. The sensed sound and time data is transmitted via the mesh network 70 to database 72 and/or separate memory storage. The sensed difference of arrival time of the sensed sound parameter as recorded and stored will then be analyzed by processing system 74 and/or one of the CPUs 85 within one or more of the sensor devices 60 (e.g., the sensor devices coupled to railroad cars 32, 35 and/or other ones of the sensor devices 60 within the system 98). Utilizing the sensed parameters of overlapping sensor devices 60 and a time difference of arrival ("TDOA") algorithm, the processing system 74 (and/or the CPU(s) 85) can determine the location of the wheel with the wheel anomaly (e.g., a broken or damaged wheel) on the train 31.

Once an anomaly (e.g., a broken or damaged wheel) has been determined by the processing system 74 and/or the CPU(s) 85, an alert is transmitted (e.g., to the lead locomotive 30, to a location away from the train 31, etc.). The alert may be visually and/or audibly displayed to the train operator for evaluation. Also within the lead locomotive 30 and part of the network 70 will be a status board in which each of sensor devices' 60 status can be monitored by the train operator. A simple green light may indicate the sensor device 60 is functioning properly and a simple red light will advise the train operator that the sensor device 60 is not working properly. The status board can be located in the train 31 and/or at a remote location(s).

In some implementations, the sensor devices 60 can be easily replaced without tools by train personnel. For example, in some implementations, an operator can just physically pull the sensor device 60 off the railroad vehicle such that a magnetic force holding the sensor device 60 thereon is overcome and place a new sensor device 60 in its place that is held by one or more magnets. For another example, in some implementations, an operator can just physically pull the sensor device 60 off the vehicle such that a sticking force (e.g., a sticker, two-sided tape, etc.) holding the sensor device 60 thereon is overcome and place a new sensor device 60 in its place that is held by a sticking force. In other implementations, an operator can pull the sensor device 60 from a socket and replace it by inserting a different sensor device 60 into the socket. If additional sensor devices 60 are needed, they can be added during operation of the train 31.

Each of the sensor devices 60 is able to measure or communicate train speed as measured through GPS and/or other sensors included therein (e.g., accelerometers(s) 81). The sensor devices 60 are able to synchronize their sensed speeds across the mesh network 70 to confirm that each of the sensor devices 60 is on the same train 31.

The sensor devices 60 are able to continuously monitor for abnormal sounds or vibrations while the train 31 is moving. Alternatively, the sensor devices 60 can be operated intermittently (e.g., every one second, every two seconds, every five seconds, every thirty seconds, every one minute, every five minutes, every twenty minutes, etc.) to, for example, conserve power.

In addition to monitoring for parameters indicative of an anomaly (e.g., a broken or damaged wheel), the continuous monitoring by sensor devices 60 may also provide feedback about potential track conditions when high impacts, high vibrations or rocking or rolling of the railroad cars are observed at the same track location as the train 31 passes over the track.

In some implementations, the mesh network 70 includes location sensors (e.g., accelerometers forming part of a Global Positioning System (GPS)) such that the system 98 is able to track train movement in real time. In such implementations, the system 98 is able to isolate the exact location of an anomaly (e.g., a broken or damaged wheel) or a suspicious condition of the track by triangulating the sensed sound/vibration (recorded by the sensor devices 60) on either side of the railroad vehicle having the anomaly. The triangulation includes the use of a clock to record the time of the sensed sound/vibration for each of the sensor devices 60 and a time difference of arrival (TDOA) algorithm.

For example, when the sensor device 60 on the railroad vehicle 32 receives a sound input indicative of an anomaly (e.g., a broken or damaged wheel) on a railroad vehicle other than railroad vehicle 32 and sensor device 60 on railroad vehicle 35 also receives the same or substantially the same sound input indicative of an anomaly (e.g., a broken or damaged wheel) on a railroad vehicle other that railroad vehicle 35, the time and location in which such sound is sensed by these two sensor devices 60 is time stamped by the clock 84 associated with each sensor device 60 and location stamped by its accelerometers. The signals indicative of the sound, location, and time are subsequently processed by the processing system 74 and/or one or more of the CPUs 85 utilizing the TDOA algorithm to determine the location of the anomaly (e.g., the wheel with the wheel anomaly) between railroad vehicles 32 and 35. The system 898 is able to monitor and track the location of the defect in real time. Such information could be coordinated with a verification or track maintenance system. For instance, an unmanned aerial vehicle ("UAV"), equipped with positioning, navigation and timing ("PNT") radios could be deployed and use information relayed by the system 98 to track its position relative to the moving train and to capture images of a suspected defect/damage and transmit the suspected defect/damage to the operator of the train, and others.

As discussed herein, the housing 61 of the sensor device 60 includes the sound sensor 63 therein, also known as a sound/vibration sensor. Further, the housing 61 may also include therein the power supply 82, the radio transmitter and receiver 83, the accelerometer(s) 81, the clock 84, the wireless communication device 90, the controller(s) 89, the CPU 85, the database 86, the TDOA algorithm 88 to determine time difference of arrival of signals from two or more sensor devices 60, the alert generator 87, or any combination thereof. The housing 61 can be or include an encapsulate (e.g., epoxy resin) such that the elements in the housing 61 are encapsulated. The encapsulate can be water resistant or waterproof, dust resistant or dust proof, etc. One or more magnets can be provided in and/or coupled to the encapsulant such that the sensor device 60 can be held tight to a ferrous base. In some implementations, a magnetic base 62 (FIG. 6) may be provided to hold housing 61 to the railroad car. The magnetic base may also contain a ferrous metal encapsulated therein which is held fast and attracted by magnetic force to the base.

Alternatively, some, or all of the functions of sensor device 60, other than the sound sensor 63, can be redundantly and/or independently performed by one or more components of the system 98 illustrated in FIG. 9. FIG. 9 depicts a computer implemented system 98, wherein individual sensor devices 60 together form a group of sensor devices 71, which communicate sensed sounds/vibrations and together form at least a portion of a mesh network 70. The group of sensor devices 71 sense sounds and generate sound signals indicative of each of the individually sensed sounds that are transmitted via the network 70 to a database 72 and/or to a processing system 74. If a train is equipped with multiple ones of the sensor devices 60, such as train 31 (FIG. 6), each sensor device 60 may also be provided with a clock 84 and radio transmitter/receiver 85 to record the time in which the sound/vibration is sensed and transmit the sound and time information to other devices for signal processing, such as the processing system 74 (FIG. 9). The sounds/vibrations and time can be transmitted wirelessly through the network 70, which includes a database 72 of known sounds/vibrations, such as gaps in rail ends, railroad switches, etc., which can assist as a filter to eliminate signals representative of the sensed sounds as known or common sounds/vibrations from the sensed sounds/vibrations emanating from the plurality of sensor devices 60.

A computer, such as CPU 85 (FIG. 8) can be provided within in the sensor devices 60, or alternatively can be provided as part of processing system 74 (FIG. 9). The database 72 is connected to processing system 74. Processing system 74 may include a CPU, a time difference of arrival algorithm, a radio, and an alert generator from which one or more types of alerts can be generated, depending on the severity of the signals emanating from the sensor devices 60. For example, a minor crack 20 in tread 12 would indicate one type of alert requiring monitoring and perhaps a visual inspection of the affected wheel at the next scheduled stop or service point, whereas a missing chunk 22 might require an alert indicative of imminent catastrophic failure of a wheel requiring immediate preventative measures to prevent derailment of the train 31.

Alternatively, if the database 72 and CPU 85 filter out known sounds/vibrations of track defects, but the sensed sounds/vibrations are all indicative of a defect in the same location on the track, it may be attributable to a defect in the track and not to a defect in a wheel. The database 72 or processing system 74 can record the location of the sensed defect as indicative of a track defect on a non-transitory computer-readable recording medium, and transmit or coordinate the location of the sensed abnormal sounds/vibrations to a track maintenance system. Some of the elements described in FIG. 9 could be located within lead locomotive 30, which would act as the master controller of all the sensor devices 60 forming part of the mesh network 70. The sensor devices 60 could then be simplified to contain only the sound sensor 63, the clock 84, the accelerometers 81, and the wireless communications device 90. A power supply 82 could be included within the housing 61, or the power supply 82 could be supplied when the sensor device 60 is mounted upon the railroad vehicle. All other functions would be conducted by the computer implemented system 98, which could be conveniently be located within lead locomotive 30 and/or dispersed throughout the train 31.

According to some implementations, a system for monitoring wheels of a train identifies a wheel anomaly in a wheel of the train and then categorizes the wheel anomaly as being one of a number of different types of wheel anomalies (e.g., two types of anomalies, three types of anomalies, five types of anomalies, etc.). For example, in some implementations, the system determines if the wheel anomaly is a routine wheel anomaly (e.g., a simple wheel flat or a pitted wheel) or a severe/catastrophic wheel anomaly (e.g., a problematic defect that is likely to cause a train derailment in the near future). Severe wheel anomalies can include, for example, a broken wheel, a damaged wheel, a chipped wheel, a cracked wheel, a derailed wheel, or any combination thereof. In some implementations, regardless of the type of wheel anomaly, the system transmits an alert. Alternatively, in some implementations, the system only transits an alert (e.g., to the when a particular type or types of wheel anomalies are detected (e.g., severe wheel anomalies). For example, in such implementations, the system only transmits an alert responsive to detecting broken wheel, a damaged wheel, a chipped wheel, a cracked wheel, a derailed wheel, or any combination thereof, but not responsive to detecting a wheel flat or a pitted wheel.

A number of methods can be used to categorize the wheel anomalies. For example, in some implementations, the system identifies a signature (e.g., an audio signature) for each detected wheel anomaly and uses the identified signatures to categorize the wheel anomalies into different groups (e.g., simple flats and severe anomalies). In some such implementations, the system uses a machine learning algorithm to categorize the wheel anomalies. The machine learning algorithm is trained over time to learn to differentiate the different wheel anomalies.

For another example, the system differentiates between a routine wheel anomaly (e.g., a simple flat) and a non-routine wheel anomaly by monitoring for hard braking events and/or skidding events where the wheels of the train skid along the rails. In such situations, the skidding can lead to simple flats on one or more of the wheels. Such flats, while considered wheel anomalies that will need attention at some point, do not typically require immediate attention (e.g., stopping the train immediately). Thus, by monitoring for such hard braking events (e.g., using one or more accelerometers) that can cause skidding and correlating the timing of such braking events to the occurrence/detection of a wheel anomaly, the system is able to categorize the wheel anomaly (e.g., simple flat) as likely being caused to the recent braking event and is thus, a routine wheel anomaly that can be addressed at a later point in time.

In some implementations, when a severe/catastrophic wheel anomaly is detected, a wheel anomaly signal is transmitted by the system to, for example, a lead locomotive such that the operator(s) is made aware of the wheel anomaly immediately. The operator can then manually address the wheel anomaly by, for example, stopping the train, removing the car with the defected wheel, fixing the defected wheel, replacing the defected wheel, slowing the train until the defected wheel can be fixed and/or replaced, etc. or any combination thereof.

In some implementations, responsive to a wheel anomaly being detected that is categorized as a severe wheel anomaly, one or more actions can be taken automatically by the system. For example, in such implementations, the system can cause the train to automatically stop, to automatically slow down, or automatically be limited to a reduced range of speed, etc. or any combination thereof.

It will be evident that those skilled in the art to whom this disclosure is directed, that they will readily envisions modifications, substitutions and equivalents, without the exercise of invention.

We claim:

1. A sensor device comprising:
   a housing configured to be mounted on a first railroad vehicle of a train;
   an audio sensor coupled to the housing and configured to (i) monitor sounds emanating from one or more wheels of railroad vehicles associated with the train as the train move along a track and (ii) generate sound data associated therewith;
   a CPU configured to:
     compare the generated sound data with known wheel sounds to determine that a wheel anomaly is present within the generated sound data;
     determine, based on the generated sound data, that the wheel anomaly is associated with a second railroad vehicle, wherein the second railroad vehicle is a different railroad vehicle than the first railroad vehicle; and
   a transmitter configured to transmit, in response to the determination that the wheel anomaly is present within the generated sound data, a wheel anomaly signal, wherein the wheel anomaly signal includes an indication of the second railroad vehicle.

2. The sensor device of claim 1, wherein the CPU is further configured to:
   receive, from a second sensor device associated with a third railroad vehicle of the train, second sound data, wherein the third railroad vehicle of the train is a different railroad vehicle than the first railroad vehicle and the second railroad vehicle;
   wherein the determination that the wheel anomaly is associated with the second railroad vehicle is further based on the second sound data.

3. The sensor device of claim 2, wherein the determination that the wheel anomaly is associated with the second is based on a time difference of arrival (TDOA) algorithm based on a time of generation of the generated sound data and a time of generation of the second sound data.

4. The sensor device of claim 1, wherein the CPU determines that the wheel anomaly is associated with the second railroad vehicle based on a time difference of arrival (TDOA) algorithm.

5. The sensor device of claim 1, wherein the CPU determines that the wheel anomaly is associated with the second railroad vehicle based on a triangulation algorithm.

6. The sensor device of claim 1, wherein the generated sound data includes an indication of a time at which the sound data is generated.

7. The sensor device of claim 1, wherein the second railroad vehicle and the first railroad vehicle are coupled together with one or more additional railroad vehicles positioned between the first railroad vehicle and the second railroad vehicle.

8. The sensor device of claim 1, wherein the CPU is further configured to:
   categorize, based on the generated sound data, a wheel defect associated with the wheel anomaly;
   wherein the wheel anomaly signal includes an indication of the category of the wheel defect.

9. The sensor device of claim 1, wherein the CPU is further configured to:
   generate, based on the generated sound data, filtered sound data, wherein portions of the generated sound data having audio signatures associated with track sounds are removed from the filtered sound data;
   wherein the comparison of the generated sound data with wheel anomaly sounds is based on the filtered sound data.

10. The sensor device of claim 1, further comprising:
    an accelerometer, wherein the accelerometer is configured to generate movement data associated with the first railroad vehicle.

11. A system comprising:
    a first sensor device mounted on a first railroad vehicle of a train, the first sensor device comprising:
      a first audio sensor configured to (i) monitor sounds emanating from wheels of the train as the train moves along the track and (ii) generate a first set of sound data associated with the monitored sounds emanating from the wheels of the train; and a transmitter, wherein the transmitter is configured to transmit the first set of sound data to a processing system;
a second sensor device mounted on a second railroad vehicle of the train, the second sensor device comprising:
 a second audio sensor configured to (i) monitor sounds emanating from the wheels of the train as the train moves along the track and (ii) generate a second set of sound data associated with the monitored sounds emanating from the wheels of the train; and
 a transmitter, wherein the transmitter is configured to transmit the second set of sound data to a processing system;
the processing system, wherein the processing system is configured to:
 receive, from the first audio sensor, the first set of sound data;
 receive, from the second audio sensor, the second set of sound data;
 determine, based on the first set of sound data and the second set of sound data, that a wheel anomaly is present within one or both of the first set of sound data and the second set of sound data;
 identify, based on the first set of sound data and the second set of sound data, a third railroad vehicle, wherein the wheel anomaly is associated with the third railroad vehicle, and wherein the third railroad vehicle is a different railroad vehicle than the first railroad vehicle and the second railroad vehicle.

12. The system of claim 11, wherein the third railroad vehicle is identified based on a time difference of arrival (TDOA) algorithm based on a time of generation of the first set of sound data and a time of generation of the second set of sound data.

13. The system of claim 11, wherein the processing system identifies the third railroad vehicle based on a triangulation algorithm.

14. The system of claim 13, wherein the first set of sound data includes a first timestamp and wherein the second set of sound data includes a second timestamp.

15. The system of claim 11, wherein (i) the first railroad vehicle, (ii) the second railroad vehicle, and (iii) the third railroad vehicle are coupled together with one or more additional railroad vehicles positioned between (i) the first railroad vehicle and second railroad vehicle and (ii) the second railroad vehicle and the third railroad vehicle.

16. The system of claim 11, wherein the processing system is further configured to:
 categorize, based on one or both of the first set of sound data and the second set of sound data, a wheel defect associated with the wheel anomaly.

17. The system of claim 11, wherein the first sensor device and the second sensor device are in wireless communication with each other, form at least a portion of a mesh wireless network, or both.

18. The system of claim 11, wherein the processing system is further configured to:
 generate, based on the determination that the wheel anomaly is present, an alert; and
 issue an alert indicating that the wheel anomaly is present.

19. The system of claim 18, wherein the issuance of the alert includes a display of an alert message on a display device, an audio message played on a speaker, a sound played on the speaker, a flashing light, or any combination thereof, and wherein the alert is indicative that one or more of the plurality of wheels is (i) broken, (ii) about to break, (iii) needs further analysis, (iv) needs servicing, or (v) any combination thereof.

20. The system of claim 11, wherein the processing system is further configured to:
 generate, based on one or both of the first set of sound data and the second set of sound data, filtered sound data, wherein portions of one or both of the first set of sound data and the second set of sound data having audio signatures associated with track sounds are filtered from one or both of the first set of sound data and the second set of sound data; and
 wherein the determination that a wheel anomaly is present is based on the filtered sound data.

* * * * *